Jan. 24, 1928.  
F. L. MORSE  
1,657,024  
CHAIN ADJUSTING MECHANISM  
Filed Sept. 27, 1923
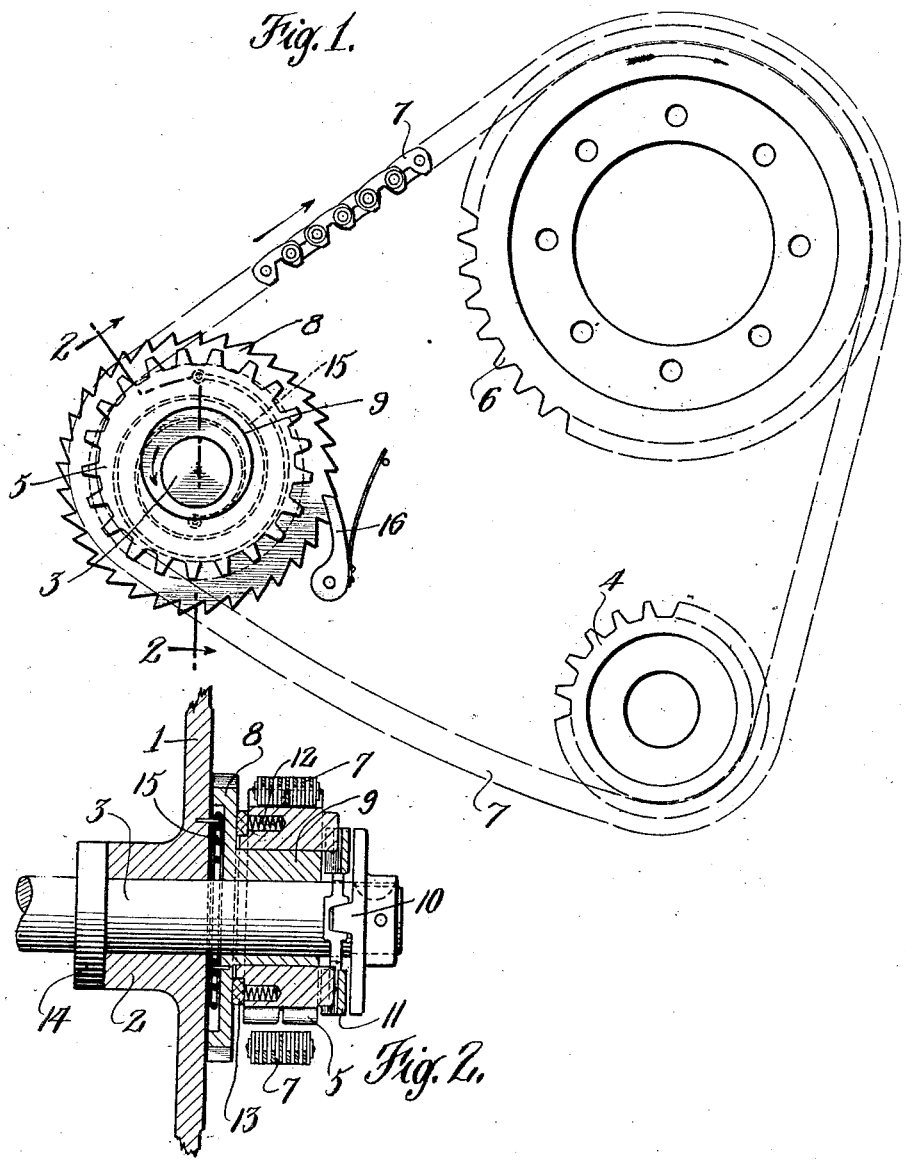

Patented Jan. 24, 1928.

1,657,024

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

CHAIN-ADJUSTING MECHANISM.

Application filed September 27, 1923. Serial No. 665,075.

This invention relates to improvements in chain adjusters and is particularly useful for front end drives for automobiles where it is desirable to make adjustments without disturbing the shaft centre and in connection with which it will be described.

One of the primary objects of my invention is to provide an effective chain adjusting mechanism which will adjust the chain to proper running tension after the mechanism of which it forms a part has come to rest.

Another object is to provide a mechanism for automatically adjusting the chain by the backward rock of the mechanism of which it forms a part.

Still another object is to provide a mechanism for automatically adjusting the chain in a direction opposite to the normal run of the chain.

Still another object is to provide a mechanism for automatically adjusting the chain which is locked against loosening after being adjusted.

In general, my invention is an improvement over devices in use which depend on hand adjustment or on tripping mechanisms, in which there is danger due to negligence of the operator or failure of parts to function.

The foregoing together with such other objects as may hereinafter appear, or are incident, to my invention, I obtain by means of a construction which I have illustrated in a preferred form in the accompanying drawings, wherein:

Fig. 1 is a face view of a typical arrangement of front end drive for automobiles with my device shown applied thereto and Fig. 2 is a section on the line 2—2 of Fig. 1.

Referring to the drawings, the reference numeral 1 indicates the gear casing, having a bearing 2, for the shaft 3 which carries the adjusting device. The shaft 3 in this particular case drives a number of accessory units, therefore it will be seen that it is important to accomplish the adjustment of the chain without disturbing the shaft centre, which would throw it out of line with the various units. In accomplishing this end applicant has provided a mechanism for adjusting the chain automatically without changing the shaft centre.

The triangular layout shown consists of a crank shaft sprocket 4, the accessory shaft sprocket 5 and the cam shaft sprocket 6 driven by the chain 7 in clockwise direction as viewed in Fig. 1. In order to bring about the adjustment in the manner desired, I have rotatably mounted on the shaft 3 the ratchet wheel 8 having an eccentric extension 9 on which the sprocket 5 is free to revolve. In order to transmit a rotary motion to the eccentrically mounted sprocket 5 from the fixed shaft 3 I have provided a flexible connection comprising an end flange 10 having tapered jaws adapted to engage correspondingly tapered recesses in the floating member 11. The opposite face of the member 11 is also provided with tapered recesses disposed at right angles to the jaws on the end flange 10, which engage similar jaws carried by the sprocket 5. In order to insure more perfect engagement of the coupling parts I have provided the springs 12 which are carried by the sprocket 5 and which bear against the hardened washer 13. The shaft is held against end movement by means of the collar 14.

It is to be observed that this spring arrangement also serves to keep the sprocket 5 and the adjusting member in frictional engagement so that it will aid in moving the adjusting member when the shaft rocks backward which is often the case when the driving mechanism is stopped. This adjustment, however, is not solely dependent on this friction and the rocking back of the shaft, in view of the fact that I have provided a spiral spring 15 having the inner end fastened to the ratchet wheel 8 and the receding or outer end fastened to the casing 1. Referring to Fig. 1 it will be seen that the action of the spring is to rotate the eccentric in a counter clockwise direction, which is against the normal run of the chain. Throwing the eccentric in this direction under the tension of the spring maintains the chain under proper running tension. In order to prevent the friction between the sprocket and the adjusting device from returning it to the looser adjustment when the chain is driving I have provided a spring held pawl 16 which prevents such returning movement.

While I have described my invention as applied to an accessory shaft driving a number of accessory units, it is equally applicable to generator mountings in which case the generator shaft would be detachably connected to the shaft 3. This mechanism may also be applied to multiple units in which two or more chains are carried by the accessory shaft. In such cases there would be a number of adjusting devices with sprockets driven as one by means of floating couplings interposed between them.

Other advantages will occur to those skilled in the art.

I claim:

1. An adjusting device for endless chains including a tension adjuster, a sprocket revolubly mounted on the tension adjuster, means for holding the tension adjuster under tension in a direction opposite the normal run of the chain and means between the tension adjuster and sprocket adapted to supplement the first mentioned means when the chain runs opposite to its normal run, together with means for holding the tension adjuster in positions of adjustments as adjustment is effected, yet permitting subsequent automatic adjustment.

2. A front end drive for automobiles comprising in combination two or more sprocket wheels, a chain driving said wheels, means for altering the tension of the chain rotatably mounted on a sprocket shaft, means operated by the sprocket shaft in its backward rock for moving said tension altering means by friction, together with means for holding the tension altering means in positions of adjustment as adjustment is effected, yet permitting subsequent automatic adjustment.

3. A front end drive for automobiles comprising in combination two or more sprocket wheels, a chain driving said wheels, means for altering the tension of the chain rotatably mounted on a sprocket shaft, means operated by the sprocket shaft in its backward rock for moving said tension altering means by friction, and means preventing the tensioning means from returning to the looser adjustment.

4. An adjusting device for automobile front end drives employing a plurality of sprockets connected by endless chains including a tension adjuster, a sprocket revolubly mounted on the tension adjuster, and means between the tension adjuster and sprocket whereby rotative movement of a predetermined value is transmitted to the tension adjuster by the sprocket, as the sprocket rotates opposite to its normal direction of rotation, together with means for holding the tension adjuster in positions of adjustment as adjustment is effected, yet permitting subsequent automatic adjustment.

5. A front end drive for automobiles comprising in combination two or more sprocket wheels, a chain passing over said wheels, and means for altering the tension of the chain, including an eccentric on which one of said wheels is mounted and means normally tending to rotate the eccentric in a direction such as to shift said wheel to tighten the chain, together with means for holding the eccentric in positions of adjustment as adjustment is effected yet permitting subsequent automatic adjustment.

6. A front end drive for automobiles comprising in combination two or more sprocket wheels, a chain passing over said wheels, a shaft for one of said wheels, an eccentric revoluble on said shaft, said wheel being revolubly mounted on said eccentric and means normally tending to rotate said eccentric in a direction to shift said wheel to take up slack in the chain, together with pawl and ratchet means for holding the eccentric in positions of adjustment as adjustment is effected.

In testimony whereof, I have hereunto signed my name.

FRANK L. MORSE.